US011679944B2

(12) United States Patent
Ooba

(10) Patent No.: US 11,679,944 B2
(45) Date of Patent: Jun. 20, 2023

(54) ARTICLE PICKING SYSTEM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 426 days.

(21) Appl. No.: 16/537,818

(22) Filed: Aug. 12, 2019

(65) Prior Publication Data
US 2020/0071094 A1 Mar. 5, 2020

(30) Foreign Application Priority Data

Aug. 31, 2018 (JP) .............................. JP2018-163798

(51) Int. Cl.
*B65G 61/00* (2006.01)
*B25J 9/16* (2006.01)
(52) U.S. Cl.
CPC ............ *B65G 61/00* (2013.01); *B25J 9/1664* (2013.01)
(58) Field of Classification Search
CPC ................................ B65G 61/00; B25J 9/1664
See application file for complete search history.

(56) References Cited

U.S. PATENT DOCUMENTS

| | | | |
|---|---|---|---|
| 4,985,846 A * | 1/1991 | Fallon | B25J 9/1697 382/153 |
| 2004/0117066 A1 | 6/2004 | Ban et al. | |
| 2006/0104788 A1 * | 5/2006 | Ban | G06T 1/0014 414/729 |
| 2011/0082586 A1 | 4/2011 | Nishihara | |
| 2011/0211938 A1 * | 9/2011 | Eakins | B25J 15/0052 901/29 |
| 2011/0223000 A1 * | 9/2011 | Martinez | B25J 9/1687 414/730 |

(Continued)

FOREIGN PATENT DOCUMENTS

| | | |
|---|---|---|
| CA | 2 807 595 A1 | 5/2013 |
| EP | 1 418 025 A2 | 5/2004 |

(Continued)

OTHER PUBLICATIONS

Japanese Office Action dated Jan. 26, 2021, in connection with corresponding JP Application No. 2018-163798 (9 pp., including machine-generated English translation).

(Continued)

*Primary Examiner* — Kyle O Logan
(74) *Attorney, Agent, or Firm* — Maier & Maier, PLLC

(57) ABSTRACT

An article picking system includes a detection device which detects a position of a plurality of articles which are moved, and a control unit, and the control unit performs work data creation processing which creates work data having position data of each of the articles, work data storage processing which stores the plurality of the created work data, region determination processing which determines determination region on the periphery of watching-target work data, which should be paid attention to, among the stored work data, and order determination processing which determines picking order of the articles by using the watching-target work data and the peripheral work data, which are within the determination region.

6 Claims, 7 Drawing Sheets

(56) References Cited

U.S. PATENT DOCUMENTS

| | | |
|---|---|---|
| 2012/0323358 A1 | 12/2012 | Izumi et al. |
| 2014/0195053 A1 | 7/2014 | Subotincic |
| 2015/0127148 A1 | 5/2015 | Varghese et al. |
| 2016/0083198 A1 | 3/2016 | Nishizaka et al. |
| 2016/0136809 A1 | 5/2016 | Subotincic |
| 2017/0017862 A1 | 1/2017 | Konishi |
| 2018/0085922 A1 | 3/2018 | Ooba |
| 2018/0194573 A1 | 7/2018 | Iwai et al. |
| 2019/0193947 A1* | 6/2019 | Koga .................. B65G 47/00 |
| 2019/0232495 A1* | 8/2019 | Zak ..................... G06T 7/0004 |

FOREIGN PATENT DOCUMENTS

| | | |
|---|---|---|
| EP | 1428634 B1 | 3/2009 |
| EP | 1816604 B1 | 7/2011 |
| EP | 2 538 373 A2 | 12/2012 |
| EP | 2 876 066 A1 | 5/2015 |
| EP | 2 998 077 A2 | 3/2016 |
| EP | 3346446 A1 | 7/2018 |
| GB | 2471819 A | 1/2011 |
| GB | 2492257 A | 12/2012 |
| JP | 2002113679 A | 4/2002 |
| JP | 2004160567 A | 6/2004 |
| JP | 2009297881 A | 12/2009 |
| JP | 2011140085 A | 7/2011 |
| JP | 2012055995 A | 3/2012 |
| JP | 2013000854 A | 1/2013 |
| JP | 2016060004 A | 4/2016 |
| JP | 2018051684 A | 4/2018 |
| JP | 2018-111140 A | 7/2018 |
| WO | 2014013609 A1 | 1/2014 |

OTHER PUBLICATIONS

Japanese Search Report dated Dec. 22, 2020, in connection with corresponding JP Application No. 2018-163798 (15 pp., including machine-generated English translation).

* cited by examiner

FIG. 3

| | | |
|---|---|---|
| 07 WORK DATA : X=●, Y=●, Z=● | : | OPERATION RELATED SCORE 80 |
| 08 WORK DATA : X=●, Y=●, Z=● | : | OPERATION RELATED SCORE 90 |
| 05 WORK DATA : X=●, Y=●, Z=● | : | OPERATION RELATED SCORE 90 |
| 06 WORK DATA : X=●, Y=●, Z=● | : | OPERATION RELATED SCORE 70 |
| 04 WORK DATA : X=●, Y=●, Z=● | : | OPERATION RELATED SCORE 80 |
| 03 WORK DATA : X=●, Y=●, Z=● | : | OPERATION RELATED SCORE 70 |
| 02 WORK DATA : X=●, Y=●, Z=● | : | OPERATION RELATED SCORE 80 |
| 01 WORK DATA : X=●, Y=●, Z=● | : | OPERATION RELATED SCORE 70 |

FIG. 5

| | | | | DETERMINATION REGION |
|---|---|---|---|---|
| 07 | WORK DATA : X=●, Y=●, Z=● | : | OPERATION RELATED SCORE | 80 |
| 08 | WORK DATA : X=●, Y=●, Z=● | : | OPERATION RELATED SCORE | 90 |
| 05 | WORK DATA : X=●, Y=●, Z=● | : | OPERATION RELATED SCORE | 90 |
| 06 | WORK DATA : X=●, Y=●, Z=● | : | OPERATION RELATED SCORE | 70 |
| 04 | WORK DATA : X=●, Y=●, Z=● | : | OPERATION RELATED SCORE | 80 |
| 03 | WORK DATA : X=●, Y=●, Z=● | : | OPERATION RELATED SCORE | 70 |
| 02 | WORK DATA : X=●, Y=●, Z=● | : | OPERATION RELATED SCORE | 80 |
| 01 | WORK DATA : X=●, Y=●, Z=● | : | OPERATION RELATED SCORE | 70 |

WATCHING

FIG. 6

| | | | DETERMINATION REGION |
|---|---|---|---|
| O7 | WORK DATA : X=●, Y=●, Z=● | : OPERATION RELATED SCORE | 80 |
| O8 | WORK DATA : X=●, Y=●, Z=● | : OPERATION RELATED SCORE | 90 |
| O5 | WORK DATA : X=●, Y=●, Z=● | : OPERATION RELATED SCORE | 90 |
| O6 | WORK DATA : X=●, Y=●, Z=● | : OPERATION RELATED SCORE | 70 |
| O4 | WORK DATA : X=●, Y=●, Z=● | : OPERATION RELATED SCORE | 80 |
| O3 | WORK DATA : X=●, Y=●, Z=● | : OPERATION RELATED SCORE | 70 |
| O2 | WORK DATA : X=●, Y=●, Z=● | : OPERATION RELATED SCORE | 80 |
| O1 | WORK DATA : X=●, Y=●, Z=● | : OPERATION RELATED SCORE | 70 |

WATCHING

ARTICLE PICKING SYSTEM

CROSS-REFERENCE TO RELATED APPLICATIONS

This application is based on and claims priority to Japanese Patent Application No. 2018-163798 filed on Aug. 31, 2018, the content of which is incorporated herein by reference in its entirety.

FIELD

This invention relates to an article picking system.

BACKGROUND

Conventionally, a known article picking system includes a detection device which detects articles moved by a transfer apparatus, and a robot, and the robot uses a tool which is provided at a distal end portion of the robot so as to pick the articles on the transfer apparatus. (See Japanese Unexamined Patent Application, Publication No. 2018-111140, for example.) In such a case where a plurality of the articles are overlapped with each other on the transfer apparatus, the article picking system starts the picking from an article which is at a high position.

An article picking system according to a first aspect of the present invention includes a detection portion which detects at least a position of a plurality of articles which are moved by a transfer means; and a control unit, wherein, the control unit performs work data creation processing which creates work data having at least position data of each of the plurality of the articles, work data storage processing which stores the plurality of the work data which are created by the work creation processing, region determination processing which determines a determination region on the periphery of watching-target work data, which should be paid attention to, among the plurality of the work data which are stored by the work data storage processing, and, order determination processing which determines picking order of the articles by using the watching-target work data which is within the determination region and peripheral work data which is on the periphery of the watching-target work data.

BRIEF DESCRIPTION OF DRAWINGS

FIG. 3 is a schematic view of a work queue of the article picking system of the embodiment.

FIG. 5 is a schematic view of a work queue of the article picking system of the embodiment.

FIG. 6 is a schematic view of a work queue of the article picking system of the embodiment.

DETAILED DESCRIPTION

An article picking system according to a first embodiment of the present invention will be described below with reference to the accompanying drawings.

Figure 1:
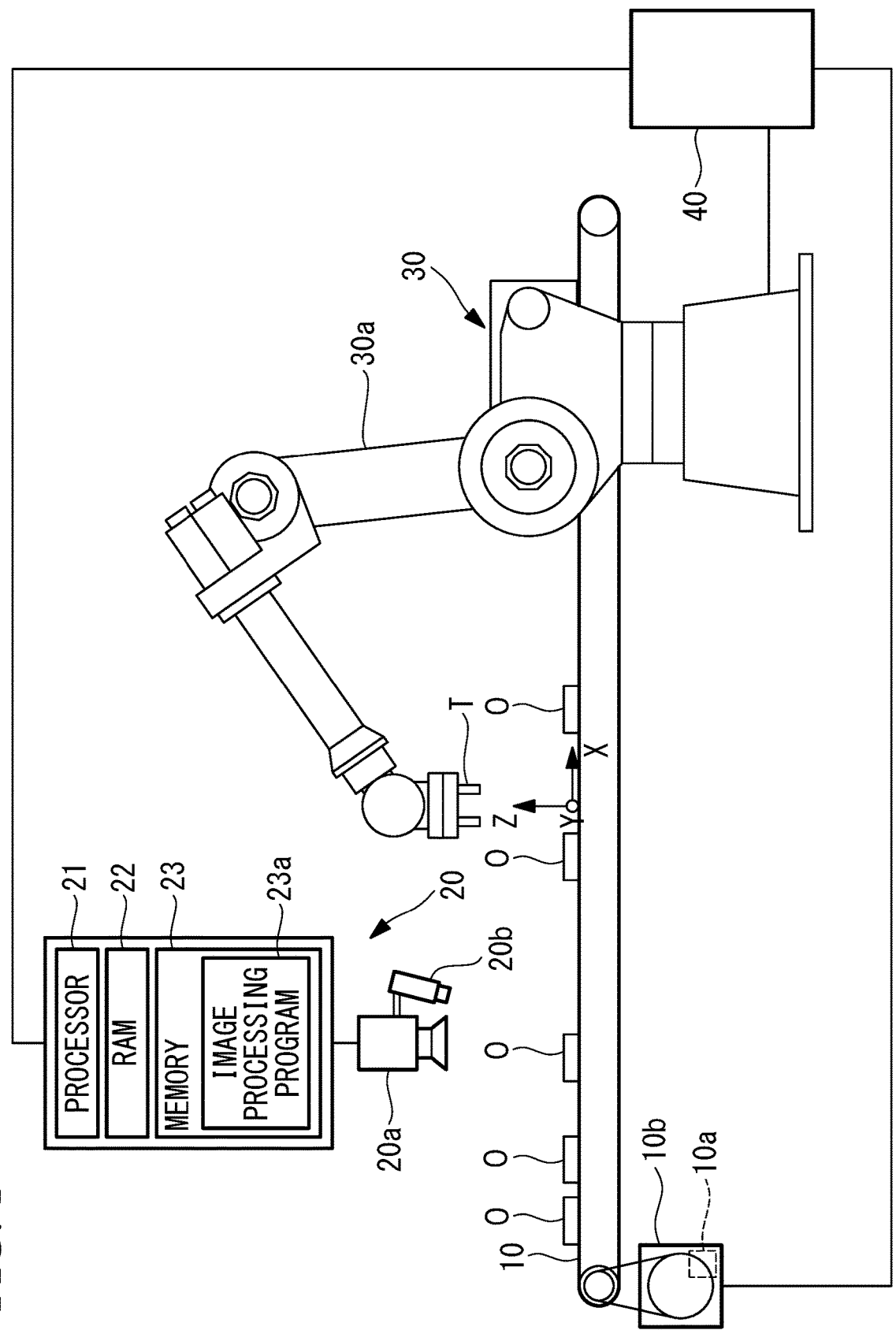
FIG. 1 is a diagram showing a configuration of an article picking system according to an embodiment of the present invention.

In one example, the article picking system according to this embodiment is a robot system which is shown in FIG. 1. This article picking system includes a transfer apparatus (a transfer means) 10, a detection device (a detection unit) 20, a robot 30, and a control unit 40 which controls the robot 30. The robot (a work machine) 30 performs picking operation with respect to articles O which are moved by means of the transfer apparatus 10. A tool T is provided at a distal end portion of the robot 30, and in one example, the robot 30 uses the tool T so as to perform picking of the articles O on the transfer apparatus 10. In this embodiment, a transfer direction of the transfer apparatus 10 and a X-axis direction of a reference coordinate system 201 of FIG. 1 correspond with each other, a height direction of the transfer apparatus 10 and a Z-axis direction of the reference coordinate system 201 of FIG. 1 correspond with each other, and a Y-axis direction of the reference coordinate system 201 of FIG. 1 is taken so as to correspond with a width direction of the transfer apparatus 10. The control unit 40 may be configured by a single controller, or may be configured by a plurality of controllers.

The robot 30 is not limited to a specific kind of robot, however, the robot 30 according to this embodiment is a vertical articulated robot having a plurality of servo motors 31 (refer to FIG. 2) for respectively driving a plurality of movable portions. Also, an arm 30a of the robot 30 is configured by the plurality of the movable portions. Each of the servo motors 31 has an operation position detection device in order to detect an operation position of each of the servo motors 31, and one example of the operation position detection device is an encoder. Detected values of the operation position detection devices are sent to the control unit 40. The robot 30 may be a horizontally articulated robot, a multi-link robot, and the like.

Figure 2:
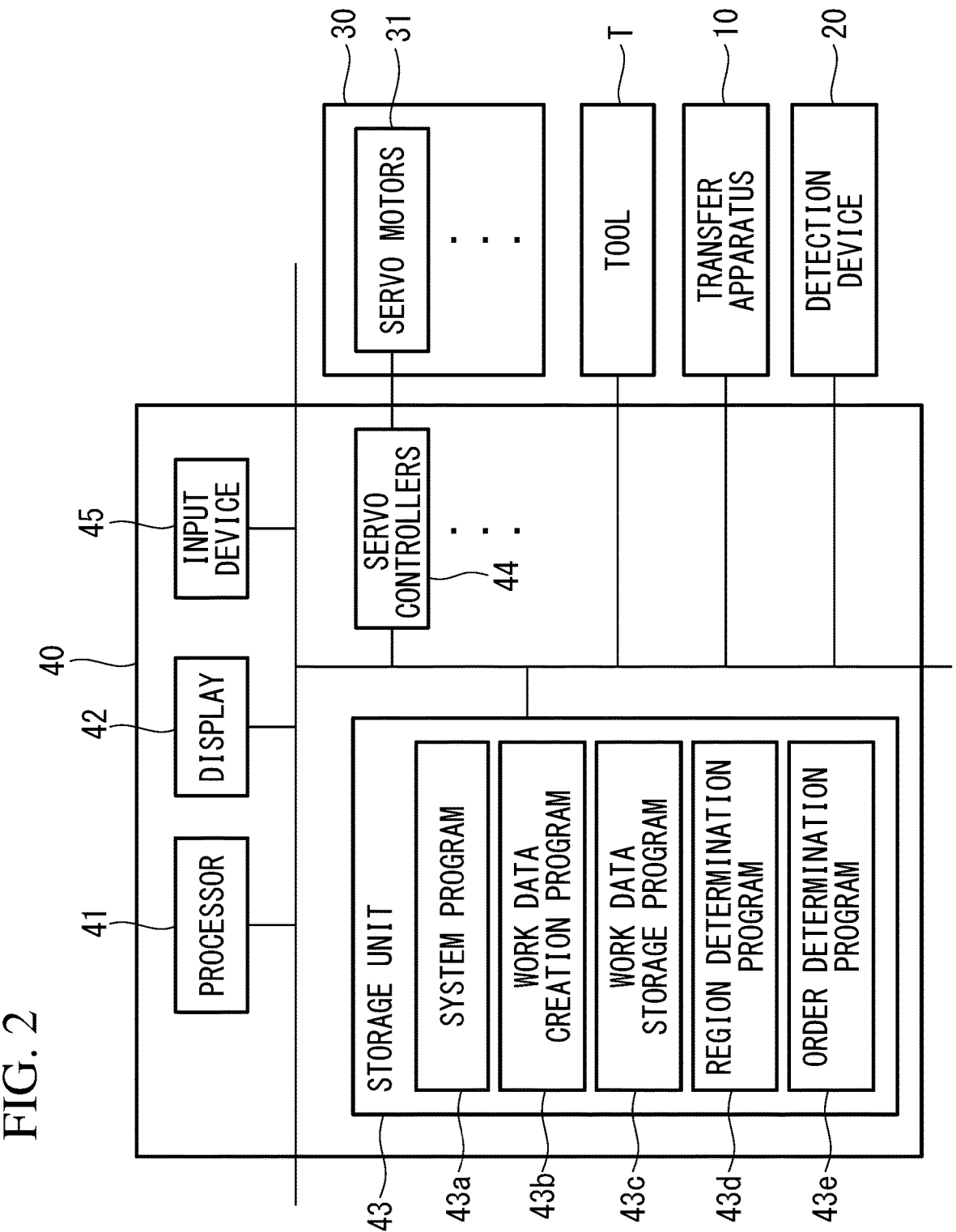
FIG. 2 is a block diagram of a control unit of the article picking system according to the embodiment.

In one example, as shown in FIG. 2, the control unit 40 includes a processor 41 which is a CPU and the like, a display 42, a storage unit 43 having a non-volatile storage, a ROM, a RAM, and the like, a plurality of servo controllers 44 which respectively correspond to the plurality of servo motors 31 of the robot 30, and a input device 45 which is a touch panel and the like.

A system program 43a is stored in the storage unit 43, and the system program 43a provides a basic function of the control unit 40. Also, a work data creation program 43b, a work data storage program 43c, a region determination program 43d, and an order determination program 43e are stored in the storage unit 43. And, an operation program and a following control program are also stored in the storage unit 43. On the basis of each of the programs, the processor 41 controls the servo motors 31 of the robot 30 and the tool T, and by this, the picking operation of the articles O which are being moved by the transfer apparatus 10 is performed.

Moreover, the detection device 20 performs the below described detection at an operation position of the robot 30 or an upstream side of the operation in the transfer direction.

The detection device 20 includes an imaging device 20a, and the imaging device 20a is a two-dimensional camera, a three-dimensional camera, and the like. A three-dimensional distance sensor and the like may be used instead of the imaging device 20a, and it is also possible to use other sensor which is capable of obtaining data for detecting a position and orientation of the articles O. The imaging device 20a of this embodiment is a three-dimensional camera (a stereo camera), and the imaging device 20a is supported by a frame and the like, which is not shown, at the upper side of the transfer apparatus 10. The detection device 20 includes, for example, a lighting device 20b which radiates visible light in order to illuminate an imaging position of the imaging device 20, and the lighting device 20b radiates the light only when the imaging device 20a captures images.

The detection device 20 includes a processor 21, a RAM 22, and a memory 23 in which an image processing program 23a are stored. On the basis of the image processing program 23a, the processor 21 performs, for example, pattern matching processing, blob processing, orientation detection process which is based on a position of a feature point, and the like. Detection data (first data element) which is obtained by the detection device 20 is sent to the control unit 40. The detection data includes at least position data of each of the articles O in the X-axis direction (horizontal position data), position data of the each of the articles in the Y-axis direction (horizontal position data), and position data of the each of the articles in the Z-axis direction (height position data), and the detection data may further include orientation data of each of the articles O.

On the basis of the image processing program 23a, the detection device 20 performs operation-related-data obtaining process which obtains a degree of coincidence (operation related score) between a shape of a predetermined portion which is detected by the pattern matching processing and a predetermined model shape, for example. In such a case where the predetermined portion is a portion which is held by the tool T, a degree of difficulty in holding the predetermined portion by means of the tool T varies depending on a shape of the predetermined portion. And therefore, the score, which is obtained with respect to each of the articles O by performing the operation-related-data obtaining process, indicates the degree of difficulty of the operation with respect to each of the articles O. The operation related data (second data element) including the operation related score (an index), which is obtained by the detection device 20, is sent to the control unit 40.

Moreover, it is also possible to obtain the operation related score of each of the articles O on the basis of the position of each of the articles O in the Y-axis direction. For example, in many cases, in the Y-axis direction, it is difficult to perform the operation at a side which is distant from the robot 10, and it is easy to perform the operation at a side which is close to the robot 10. For that reason, by determining the operation related score in response to the position data of each of the articles O in the Y-axis direction, it is possible to improve accuracy and certainty of the operation.

In addition, it is also possible to obtain the operation related score on the basis of the orientation of each of the articles O. Because of the shape of the articles O, the shape of the tool T of the robot 30, and the like, there may be such orientation of the article O that is difficult for the robot 30 to perform the operation. In this case, by determining the operation related score on the basis of an operation related score based on the orientation of the article O, the accuracy and the certainty of the operation of the robot 30 are improved.

Furthermore, the processor 21 of the detection device 20 may perform quality-related-data obtaining process for obtaining a degree of coincidence (quality related score) between a shape of the detected article O and the shape of the predetermined model. For example, when the articles O are perishable food, the shape of the articles O changes depending on degree of freshness of the food, whether or not the food is spoiled, and the like. In this case, the detection device 20 obtains the quality related score with regard to the quality of each of the articles, and sends quality related data (second data element) including the obtained quality related score to the control unit 40.

The transfer apparatus 10 includes an encoder 10a which can detect a transfer amount of the articles O. The encoder 10a is provided inside a motor 10b which drives the transfer apparatus 10, for example.

In one example, the detection device 20 performs the position detection process, the orientation detection process, the operation-related-data obtaining process, and the quality-related-data obtaining process of the articles O at every time when a predetermined transfer amount is detected by the encoder 10a.

On the basis of the work data creation program 43b, the processor 41 of the control unit 40 creates the work data which includes the plurality of the detection data (first data element), the corresponding operation related data (second data element) and the corresponding quality related data (second data element) with respect to each of the articles O. The detected data includes the position data of the articles O. And, on the basis of the work data storage program 43c, the processor 41 stores the created work data in the storage unit 43. In one example, the work data is stored in a work queue, and the plurality of the work data are arranged in a row in the work queue on the basis of the position data thereof. More specifically, in the work queue, the plurality of the work data are arranged in a row in an order from the downstream side of the transfer apparatus 10 in the transfer direction (refer to the schematic view of FIG. 3). In FIG. 3, each of the work data includes the operation related score only, however, each of the work data may include the quality related score.

Figure 4:
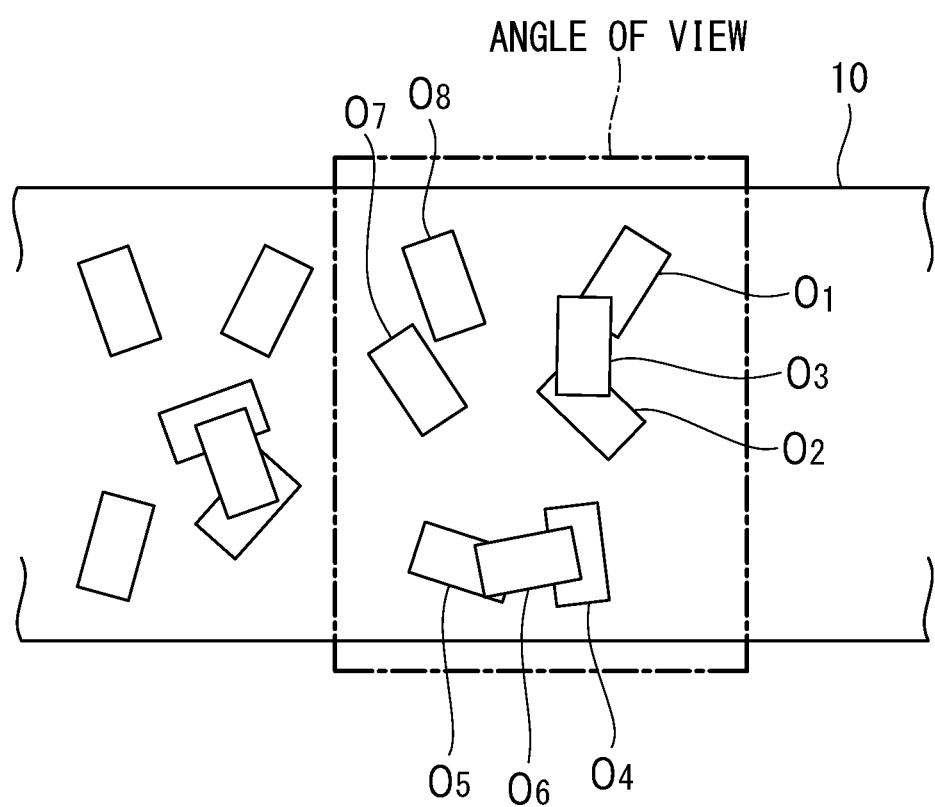
FIG. 4 is a diagram showing a state of articles on a transfer apparatus of the article picking system of the embodiment.

FIG. 4 shows a state in which there are a plurality of articles $O_1$ to $O_8$, which are on the transfer apparatus 10, within an angle of view of the detection device 20. In an example of FIG. 4, the article $O_3$ is overlapped with the article $O_1$ and the article $O_2$ in the Z-axis direction, and the article $O_6$ is overlapped with the article $O_4$ and the article $O_5$ in the Z-axis direction. And therefore, the position data of the article $O_3$ in the Z-axis direction (the height position data) is larger than the height position data of the article $O_1$ and the article $O_2$, and the height position data of the article $O_6$ is larger than that of the article $O_4$ and the article $O_5$. In this embodiment, the height position data of the article $O_3$ and the article $O_6$ are larger than that of the articles $O_1$, $O_2$, $O_4$, $O_5$, $O_7$, $O_8$.

On the basis of the region determination program 43d, the processor 41 of the control unit 40 determines a determination region as shown in FIG. 5. The determination region is configured by watching-target work data for which attention should be paid, and peripheral work data having the horizontal position data which is within a predetermined range with respect to the horizontal position data of the watching-target work data. The horizontal position data is position data in the X-axis direction and the Y-axis direction. In the example of FIG. 5, the watching-target work data is the work data of the article $O_1$. It is possible to appropriately set a reference of the watching-target work data based on whether the position is at the most downstream, work data having the highest score, a combination thereof.

Figure 7:
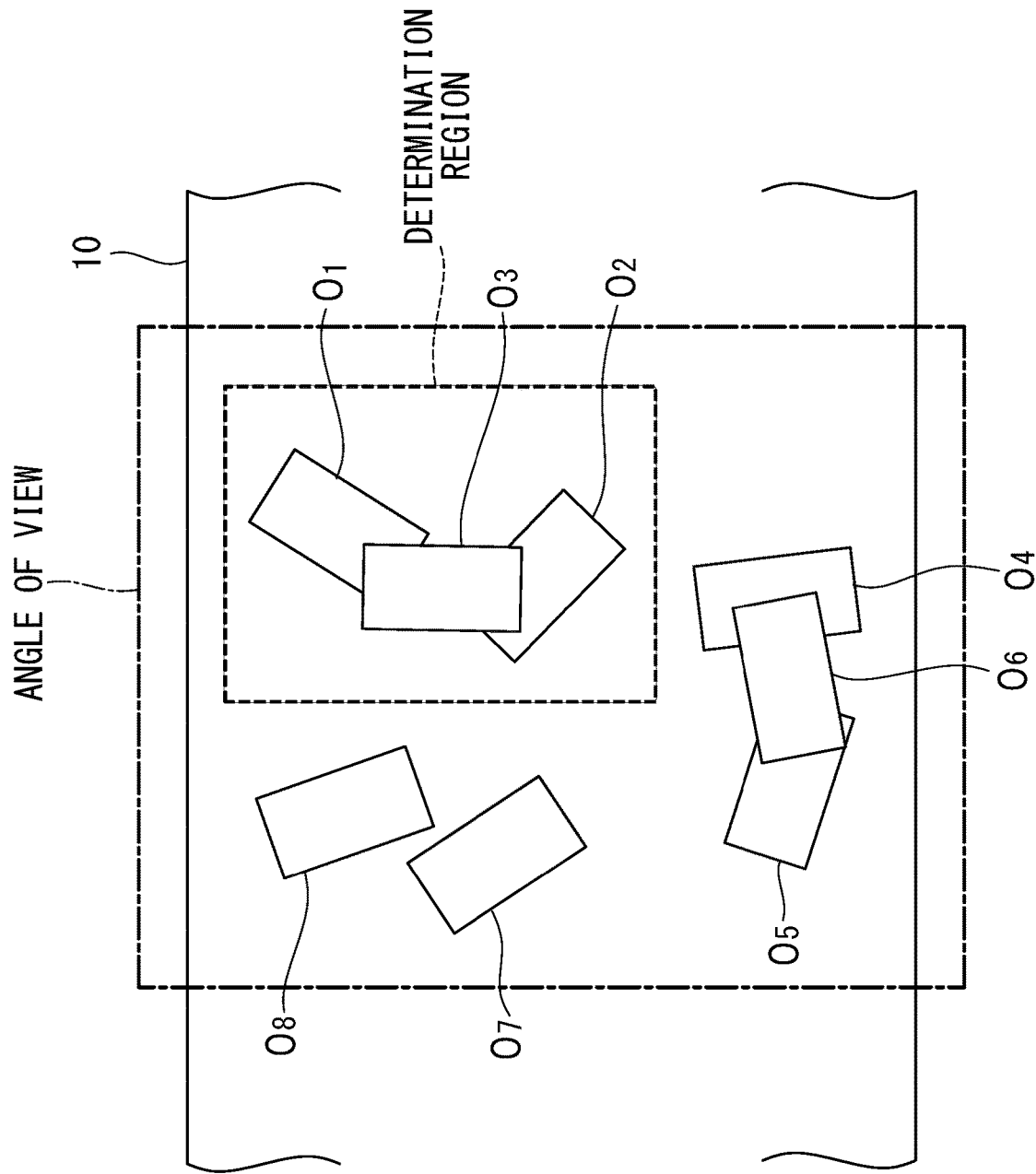
FIG. 7 is a diagram schematically showing a determination region which is set by the article picking system of the embodiment.

In this embodiment, in such a case where there is the work data of the article $O_3$ whose height position data is larger than the work data of the article $O_1$ (watching-target work data) in the determination region, the processor 41 changes the watching-target work data to the work data of the article $O_3$ (FIG. 6). By changing the watching-target work data, the determination region is also changed to new watching-target work data and new peripheral work data having the horizontal position data which is within the predetermined range from the horizontal position data of the new watching-target work data. After changing the watching-target work data in the above described manner, the watching-target work data may further be changed in the same manner. By this, the determination region is appropriately set without requiring the complicated processing, and in addition, the determination region, which is centering around an article O having the highest priority (an article at the highest position) among a clump of articles O which is required to be processed in a preferential manner (a clump of articles O at the most downstream side), is certainly set. The determination region shown in FIG. 7 is the determination region which is drawn schematically.

By appropriately setting the determination region in response to a size of the articles O, transfer speed of the transfer apparatus 10, time required to pick the each of the articles O, and the like, it is possible to pick the articles O sequentially from the clump of the articles O at the downstream side efficiently, for example. Also, in such a case where another robot is provided at the downstream side of the robot 30, the picking order is determined taking the other robot into consideration, and there may be a case where the robot 30 does not pick all of the articles O from each of the clumps.

Subsequently, the processor 41 uses the work data (watching-target work data) of the article $O_3$, which is within the determination region, and the work data (the peripheral work data) of the article $O_1$ and the article $O_2$, which is the other work data within the determination region, so as to determine the picking order of the articles $O_1$, $O_2$, $O_3$ which are within the determination region. Reference which is used so as to determine the picking order is the height position data, the operation related score, the quality related score, and the like. In this embodiment, the reference of the highest priority is descending order of the position data, and the reference of the second priority is order which is related to distance from the downstream, and the reference of the third priority is descending order of the score. The above described reference and the order can appropriately be changed.

The processor 41 sequentially performs the above described processing with respect to the other clumps of the articles O. For example, after performing the above described processing with respect to the clump of the articles $O_4$, $O_5$, $O_6$, the above described processing is performed on the clump of the articles $O_7$, $O_8$.

As shown in FIG. 7, there are the other articles $O_4$, $O_5$, $O_6$ which are piled up in the vicinity of the articles $O_1$, $O_2$, $O_3$, and therefore, the determination region is appropriately set in response to the size of the articles O. For example, in such a case where the work data of the articles $O_4$, $O_5$, $O_6$ are included in the determination region, at the time of determining the picking order, the picking order of the article $O_6$ becomes second, which may not be preferable. The control unit 40 accepts the setting of the determination region from the input unit 45, other computer, and the like. Accordingly, an operator can set the predetermined range appropriately in response to a type and quantity of the articles O, condition of the articles O on the transfer apparatus 10, and the like.

Also, the determination region may be a circle, any shape, or a combination of a plurality of any shapes, and the like. In addition, the determination region can be determined appropriately in response to the size, the type, and the quantity, of the articles O, the condition of the articles O on the transfer apparatus 10, and the like.

In this embodiment, the determination region which is configured by the watching-target work data for which attention should be paid, and at least one of the peripheral work data having the position data, which is within the predetermined range with respect to the position data of the watching-target work data, among the plurality of the stored work data, is determined, and the picking order is determined within the determination region. For example, when the work data of the article $O_1$, which is at the most downstream side, is used as the watching-target work data, only the clumps of the articles $O_1$, $O_2$, $O_3$, which are on the periphery of the article $O_1$ of the most downstream side are included in the determination region. Therefore, by appropriately setting the predetermined range, it is possible to determine the picking order for each of the clumps of the watching-target articles O. In this aspect, it is not always necessary to perform complicated processing which takes the height, the position, and the like of each of the articles O into account, which facilitates the setting, and which contributes the effective picking of the articles O.

Also, in this embodiment, the position data, which is held by each of the work data, includes height position data and the horizontal position data, and the determination region includes the work data having the horizontal position data which is within the predetermined range with respect to the horizontal position data of the watching-target work data. And therefore, it is possible to set the determination region appropriately without requiring the complicated processing.

Moreover, in this embodiment, the work data has the operation related score which is related to a degree of difficulty of the picking operation with respect to the article O.

With this configuration, when the control unit 40 performs the order determination processing, it is possible to make the determination on the basis of the operation related score. For example, with regard to the work data of an article O which is hard to pick because of the operation related score lower than a predetermined reference, it is possible to determine to perform processing so as to lower the picking order of the article O, or determine not to perform the picking operation for the article O, which is advantageous for picking the articles O effectively.

In addition, in this embodiment, at the time of creating the work data, the control unit 40 creates the work data further having a score which is different from the operation related score.

In response to a type of the articles O, a purpose of the picking operation, and the like, there is a case where a score which is different form the degree of difficulty of the picking operation is prioritized. For example, when the articles O are perishable food, the work data having the quality related score which shows quality, a type, and the like of the articles O is created. By this, when the control unit 40 performs the order determination processing, it is possible to make the determination on the basis of the quality related score, and this configuration is advantageous for determining the picking order flexibly in response to the purpose.

And, in this embodiment, it is also possible to detect the transfer amount of the articles O by using a camera instead of using the encoder 10a. For example, it is possible to detect the transfer amount of the articles O by detecting a mark, the articles O, and the like on the transfer apparatus 10 by means of the camera. It is also possible to detect the transfer amount by using other means.

Also, in this embodiment, instead of using the transfer apparatus 10, other robot, an AGV (Automated Guided Vehicle) may transport the articles O. In this case also, the same effect as described above can be achieved. And, in such a case where the article O is a vehicle, a frame of a vehicle, and the like, the article O on which predetermined processing is performed may be moved by an engine, wheels, and the like of the vehicle, the frame of the vehicle, and the like. In these cases, the other robot, the engine, the wheels, and the like function as the transfer means.

Also, in this embodiment, a function which is performed by the image processing program 23a of the detection device 20 may be performed by the control unit 40 or the other computer.

And, in this embodiment, in such a case where the plurality of the articles O are not overlapped with each other in the Z-axis direction on the transfer apparatus 10, the processor 41 of the control unit 40 determines the determination region, which includes the watching-target work data and the peripheral work data, on the basis of the region determination program 43d, and the processor 41 can determine the picking order of the articles O in the determination region.

In this case, for example, the reference of the highest priority is the order from the downstream, and the reference of the second priority is order from a position having a low degree of difficulty for operation by the robot 30 in the Y-axis direction. It is also possible to add the degree of difficulty for the operation in the work data as the operation related data.

The following aspects of the present invention are derived from the above disclosure.

An article picking system according to a first aspect of the present invention includes a detection portion which detects at least a position of a plurality of articles which are moved by a transfer means; and a control unit, wherein, the control unit performs work data creation processing which creates work data having at least position data of each of the plurality of the articles, work data storage processing which stores the plurality of the work data which are created by the work creation processing, region determination processing which determines a determination region on the periphery of watching-target work data, which should be paid attention to, among the plurality of the work data which are stored by the work data storage processing, and, order determination processing which determines picking order of the articles by using the watching-target work data which is within the determination region and peripheral work data which is on the periphery of the watching-target work data.

In an example, the determination region includes the watching-target work data and the peripheral work data having position data which is within a predetermined range with respect to position data of the watching-target work data.

For example, in such a case where the plurality of the articles are overlapped with each other on the transfer apparatus, it is necessary to perform picking from an article which is placed on the top. And therefore, the picking order is descending order of height position data which shows a position in a height direction. However, on the transfer apparatus, there are plural clumps of the articles which are overlapped with each other. Moreover, there is also a case where the articles are piled up higher in the clump of the articles at the upstream side rather than the clump of the articles at the most downstream side. In this case, when the picking order is determined by setting all of the articles which are within an angle of view of an imaging device of the detection portion as targets, for example, the articles are preferentially picked up from the highest clump of the articles, and not from the clump of the articles at the most downstream side. In this way, many of the articles, which are placed at the most downstream side, are left on the transfer apparatus, which is not preferable.

In the above aspect, the determination region is determined at the periphery in the stored plural work data, and the picking order is determined within the determination region. For example, in such a case where the work data of the articles at the most downstream side is used as the watching-target work data, the determination region only includes the clump of the articles which includes the articles at the periphery of the articles at the most downstream side. And therefore, by appropriately setting the predetermined range, it is possible to determine the picking order for each of the clumps of the watching-target articles. With this aspect, it is not always necessary to perform complicated processing of considering the height, the position, and the like of the other clumps of the articles, which facilitates the setting, and which contributes to effective picking of the articles.

In the above aspect, preferably, the determination region is determined in response to size, a type, and quantity of the articles, condition of the articles on the transfer apparatus, and the like.

In the above aspect, preferably, the position data includes height position data which shows a position in the height direction, and horizontal position data which shows a position in a direction orthogonal to the height direction, and the determination region includes the peripheral work data having the horizontal position data which is within the predetermined range with respect to the horizontal position data of the watching-target work data.

With this aspect, the determination region includes the work data having the horizontal position data which is within a predetermined range with respect to the horizontal position data of the watching-target work data. And therefore, it is possible to appropriately set the determination region without complicated processing.

With the above aspect, preferably, the work data has an operation related score which is related to a degree of difficulty of the picking operation with respect to the articles.

In this aspect, when the control unit performs the order determination processing, it is possible to make the determination on the basis of the operation related score. For example, with regard to work data of an article whose operation related score is lower than a predetermined reference, which means that the article is hard to pick, it is possible to perform processing to delay the picking order, or to determine not to pick the article, which is advantageous for the effective picking of the articles.

In the above aspect, preferably, the control unit creates the work data further having a score, which is different from the operation related score, in the work data creation processing.

There is a case where a score which is different from the degree of difficulty of the picking operation is prioritized in response to a type of the articles, a purpose of the picking operation, and the like. For example, when the articles are perishable food, the work data having a quality related score which shows quality, a type, and the like of the articles is made. By this, when the control unit performs the order determination processing, it is possible to make determination on the basis of the quality related score, and this configuration is advantageous for flexibly determining the picking order in response to the purpose.

In the above aspect, preferably, the control unit determines picking order so as to pick up the articles from a high position on the basis of the height position data of the watching-target work data and that of the peripheral work data in the order determination processing.

According to the above aspects, it is possible to contribute to effective picking of articles which are moved by a transfer apparatus without complicated setting.

The invention claimed is:

1. An article picking system, comprising:
a detection portion which is configured to detect at least a-positions of a plurality of articles which are moved by a transfer apparatus; and
a control unit configured to:
  create a plurality of pieces of work data each corresponding to each of the plurality of articles, each piece of work data having at least position data corresponding to one of the detected positions of the plurality of articles;
  store the created plurality of pieces of the work data;
  determine a determination region which includes at least an original target among the stored plurality of pieces of the work data;
  set, when the determination region includes a piece of the work data whose position is higher than the original target, the piece of the work data whose position is higher than the original target as a new target;
  determine a new determination region which includes the new target, which corresponds to an article of the plurality of articles, and at least one periphery piece of the work data, which corresponds to another article of the plurality of articles, whose horizontal position is within a predetermined range of the new target; and
  determine a picking order of the plurality of articles by using the new target and the at least one peripheral piece of the work data.

2. The article picking system according to claim 1, wherein the control unit is further configured to:
  determine the determination region in response to size, a type, and quantity of the plurality of articles and condition of the plurality of articles moved by the transfer apparatus.

3. The article picking system according to claim 1, wherein the position data include height position data showing a position in a height direction, and horizontal position data showing a position in a direction orthogonal to the height direction, and the new determination region includes the at least one peripheral piece of the work data having the horizontal position data which is within the predetermined range with respect to the horizontal position data of the new target.

4. The article picking system according to claim 3, wherein the control unit is further configured to:
  determine the picking order so as to pick up the plurality of articles from a high position on the basis of the height position data of the new target and that of the at least one peripheral piece of the work data.

5. An article picking system, comprising:
a detection portion which is configured to detect at least a position of a plurality of articles which are moved by a transfer apparatus; and
a control unit configured to:
  create a plurality of pieces of work data, each piece of work data having at least position data corresponding to one of the plurality of articles;
  store the created plurality of pieces of the work data;
  determine a determination region on a periphery of an original target among the stored plurality of pieces of the work data;
  set, when the determination region includes a piece of the work data whose position is higher than the original target, the piece of the work data whose position is higher than the original target as a new target;
  determine a new determination region which includes the new target and at least one periphery piece of the work data whose horizontal position is within a predetermined range of the new target; and
  determine a picking order of the plurality of articles by using the new target and the at least one peripheral piece of the work data, wherein each piece of the work data includes an operation related score which is related to a degree of difficulty of picking with respect to the plurality of articles.

6. An article picking system comprising:
a detection portion which is configured to detect at least a position of a plurality of articles which are moved by a transfer apparatus; and
a control unit configured to:
  create a plurality of pieces of work data, each piece having at least position data corresponding to one of the plurality of articles;
  store the created plurality of pieces of the work data;
  determine a determination region on the periphery of a target among the stored plurality of pieces of the work data; and
  determine a picking order of the plurality of articles by using the target which is within the determination region and at least one peripheral piece of the work data which is on the periphery of the target, wherein each piece of the work data includes an operation related score which is related to a degree of difficulty of picking, and a score which is different from the operation related score, with respect to the plurality of articles.

* * * * *